A. P. ROHMILLER.
SPOON HOLDER.
APPLICATION FILED FEB. 24, 1920.
1,393,574.
Patented Oct. 11, 1921.
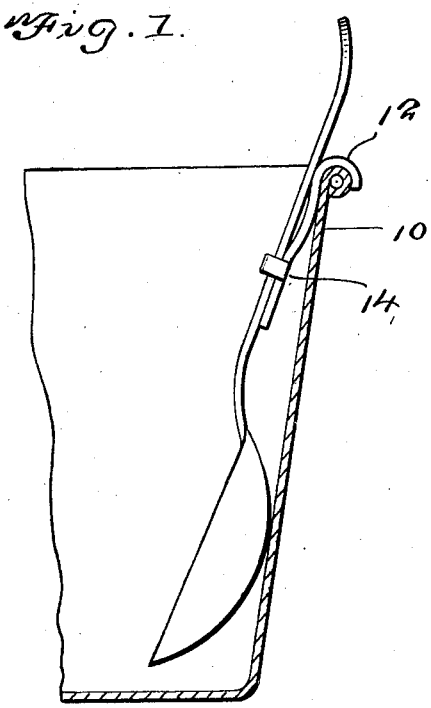
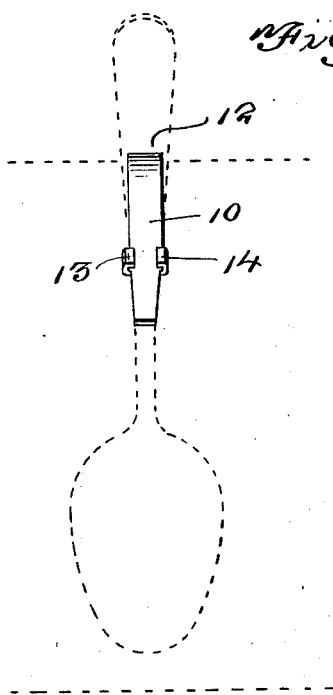
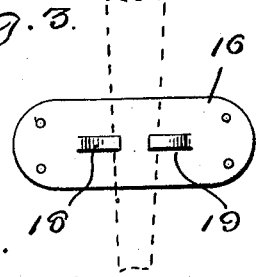
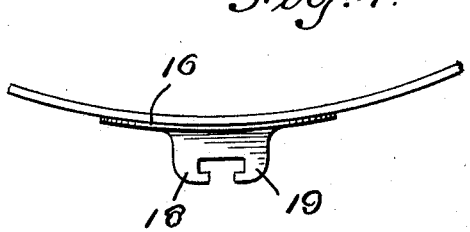
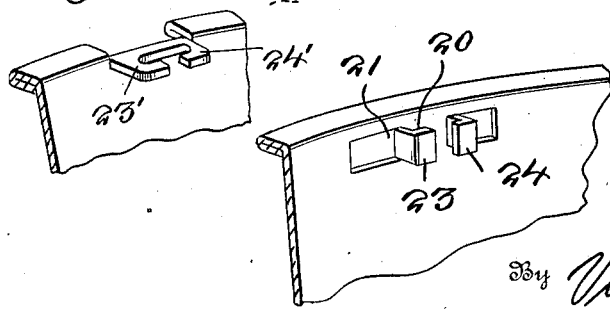
Inventor
A. P. Rohmiller
By Victor J. Evans
Attorney

UNITED STATES PATENT OFFICE.

ALDACE P. ROHMILLER, OF MAPLETON, IOWA.

SPOON-HOLDER.

1,393,574.  Specification of Letters Patent.  Patented Oct. 11, 1921.

Application filed February 24, 1920. Serial No. 360,687.

*To all whom it may concern:*

Be it known that I, ALDACE P. ROHMILLER, a citizen of the United States, residing at Mapleton, in the county of Monona and State of Iowa, have invented new and useful Improvements in Spoon-Holders, of which the following is a specification.

This invention relates to a spoon holder and one object is to provide a device which may be attached to the side of a utensil intended for cooking purposes or the like, and which shall include a main portion, and spoon engaging devices carried thereby, adapted to retain the spoon in a convenient position, and so that the handle will always be accessible to the person intending to make use of the article.

A further object is to provide, in another form of the device, a utensil such as a deep pan, the wall of which is deflected, preferably in an approximately horizontal position, and is cut away or upset for the purpose of forming spoon engaging devices, whereby the desired result is attained without the use of a separate attachment.

With the following and other objects in view, the invention consists in the novel construction hereinafter described and claimed.

In the drawings:—Figure 1 is an edge view of a spoon and spoon holder, a fragment of the receptacle being shown in section.

Fig. 2 is a face view of the holder, a spoon being shown in dotted lines.

Figs. 3 and 4 are side and plan views of another form.

Figs. 5 and 6 are fragmentary views in perspective of additional forms.

In that form of the invention first to be described, I provide a plate member 10, having one end curved, as shown at 12, and adapted to engage the upper edge of a pan or other receptacle or utensil.

At the proper place, this plate member is provided along the edges thereof with ears 13 and 14 which are deflected toward each other and are adapted to engage a spoon, or the handle portion thereof, in order to support the article in a convenient position, with the handle projecting above the upper edge of the receptacle.

The proportions and curvature of that portion of the device intended to engage the upper edge of the receptacle are such that the attachment will fit almost any utensil in ordinary use.

In the form shown in Figs. 3 and 4 I have provided a modification in which the plate portion 16 has an additional set of ears or spoon engaging devices shown at 18 and 19, these being designed to support the spoon with the bowl portion thereof beyond, or outside of, the walls of the receptacle. Under these conditions the handle of the spoon will remain reasonably cool, and it is not necessary for the user to subject his hand to the steam which may be arising from the contents of the receptacle.

In that form of the device shown in Fig. 6 the flange or inwardly turned portion 20 of the wall of the receptacle is provided with a cutaway portion for the reception of the handle of the spoon. The deflected portion is designated 21′, and the undercut edge portions thereof, forming ears, are shown at 23′ and 24′. In this instance no separate attachment is required, and in the use of the utensil so equipped, means for retaining the spoon in a convenient position, are always at hand. The receptacle is of the type having the usual external flange, and as shown in the drawing the inturned flange is produced, at one point, from metal which would have otherwise formed a part of the external flange.

What is claimed is—

In a device of the class described, a receptacle the side wall of which is outwardly turned to form an external flange along one edge, a portion of the edge of the side wall being inwardly deflected to form an inwardly turned flange, said flange being cutaway and the cutaway portion having undercut walls, for forming an engaging device for a spoon or the like.

In testimony whereof I affix my signature.

ALDACE P. ROHMILLER.